United States Patent [19]
Catchesides et al.

[11] Patent Number: 5,697,578
[45] Date of Patent: Dec. 16, 1997

[54] NAVIGATIONAL SYSTEM AND METHOD

[75] Inventors: Phillip Catchesides; Richard F. Ball, both of Bristol, United Kingdom

[73] Assignee: British Aerospace Public Limited Co., London, England

[21] Appl. No.: 481,826

[22] Filed: Jan. 26, 1990

[30]     Foreign Application Priority Data

Jan. 27, 1989 [GB] United Kingdom ............... 8901847

[51] Int. Cl.$^6$ ............................................. F41G 7/20
[52] U.S. Cl. .................... 244/3.11; 244/3.13; 244/3.14
[58] Field of Search ........................... 244/3.11, 3.13, 244/3.14

[56]           References Cited

U.S. PATENT DOCUMENTS

| | | | |
|---|---|---|---|
| H299 | 7/1987 | Miller, Jr. ........................... | 244/3.13 |
| 3,698,811 | 10/1972 | Weil ..................................... | 244/3.14 X |
| 3,856,237 | 12/1974 | Torian et al. ...................... | 244/3.11 |
| 3,876,308 | 4/1975 | Alpers .................................. | 244/3.16 X |
| 4,100,545 | 7/1978 | Tabourier ............................ | 342/62 |
| 4,256,275 | 3/1981 | Flick et al. ......................... | 342/193 X |
| 4,476,494 | 10/1984 | Tugayé ................................ | 244/3.17 X |
| 4,492,352 | 1/1985 | Yueh ................................... | 244/3.15 |
| 4,516,743 | 5/1985 | Sweeney et al. .................. | 244/3.13 |
| 4,565,339 | 1/1986 | Lonnoy et al. .................... | 244/3.13 |
| 4,676,455 | 6/1987 | Diehl et al. ........................ | 244/3.13 |
| 4,732,349 | 3/1988 | Maurer ................................. | 244/3.13 |
| 4,750,688 | 6/1988 | Davies ................................. | 244/3.11 |
| 4,768,736 | 9/1988 | Morten et al. ..................... | 244/3.11 |
| 4,796,834 | 1/1989 | Ahlstrom ............................ | 244/3.16 |
| 4,925,129 | 5/1990 | Salkeld et al. ..................... | 244/3.11 |
| 4,967,979 | 11/1990 | Balstad ............................... | 244/3.11 |
| 4,997,144 | 3/1991 | Wolff et al. ........................ | 244/3.14 |
| 5,056,736 | 10/1991 | Barton ................................. | 244/3.13 |
| 5,147,088 | 9/1992 | Smith et al. ........................ | 244/3.11 |

FOREIGN PATENT DOCUMENTS

| | | |
|---|---|---|
| 0048068 | 3/1982 | European Pat. Off. . |
| 3343604 | 6/1985 | Germany . |
| 1042163 | 9/1966 | United Kingdom . |
| 1529388 | 10/1978 | United Kingdom . |
| 2212252 | 7/1989 | United Kingdom . |

*Primary Examiner*—John B. Sotomayor
*Attorney, Agent, or Firm*—Cushman, Darby & Cushman IP Group of Pillsbury Madison & Sutro LLP

[57]           ABSTRACT

A navigational system for determining the relative position of two objects, which comprises projector means for projecting an information field to be at least partially incident on both said objects, receiver means associated with at least one of said objects for detecting the information field incident on said two objects, and means responsive to the receiver means to determine the relative position of said objects.

13 Claims, 2 Drawing Sheets

NAVIGATIONAL SYSTEM AND METHOD

This invention relates to navigational systems and methods for determining the relative position of two objects and in particular, but not exclusively, to such systems and methods for guiding a projectile towards a target.

In one conventional form of projectile guidance system the target is tracked and an "information field" is projected around the nominal target position. The information field is a radiation pattern, e.g. laser or radar, which can be detected by an object in the field to allow that object to establish its position relative to the centre of the field and thus calculate course correction signals so that the object moves to the centre of the field.

However, it is not possible to make the centre of the field lie exactly on the target. The reasons for this are that trackers are imperfect devices and that precise collimation between the tracker and the field projector is not possible. With the imperfections given above there will always be an error between the centre of the field and the target and it is to the centre of the field, not the target, that the projectile will be guided. The result of this is that the miss distance will be higher, thereby requiring a larger war head and a more capable fuze.

Accordingly, in one aspect this invention provides a navigational system for determining the relative positions of two objects, which comprises projector means for projecting an information field at least partially incident on both said objects, receiver means associated with at least one of said objects for detecting the information field incident on said two objects, and means responsive to the receiver means to determine the relative position of said objects.

In another aspect, this invention provides a projectile guidance system for determining the angular positions of a projectile and a target relative to a datum, which comprises projector means for projecting an information field towards the nominal target position, and a projectile having aft-looking information field receiver means for receiving said information field from said projector means and forward-looking information field receiver means for receiving the information field reflected by said target.

In a further aspect, this invention provides a projectile including means for receiving an information field from which the position of the projectile relative to a datum may be calculated and means for receiving an information field from which the position of a target relative to said datum may be calculated.

In yet a further aspect, this invention provides a method for determining the relative positions of two objects, which comprises projecting an information field to be at least partially incident on both said objects, detecting the information field incident on said objects and thereby determining their relative position.

In yet another aspect this invention provides a method for determining the range-to-go and/or the closing velocity between a projectile and a target, which comprises illuminating said projectile and said target with a beam of radiation from a source generally aligned with a line connecting the projectile and target, monitoring the times of arrival at the projectile of radiation direct from said source and radiation reflected from said target thereby to determine the range-to-go and or the closing velocity.

The invention may be performed in many ways and an embodiment thereof will now be described, by way of example, reference being made to the accompanying drawings, in which.

Figure 1:
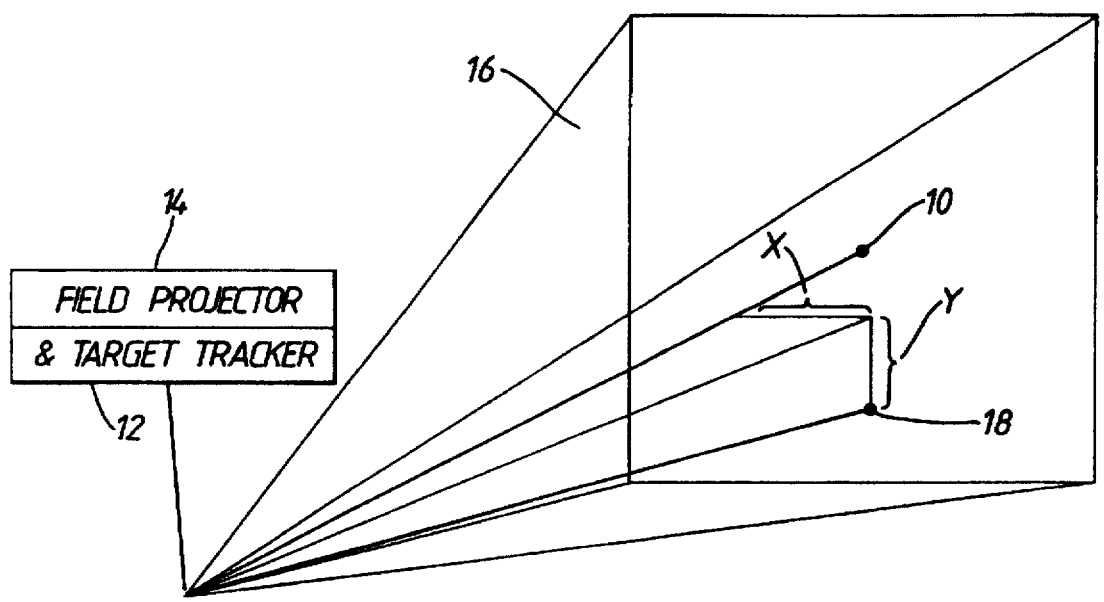
FIG. 1 illustrates the principle of operation of a conventional information field guidance system.

In the conventional system illustrated in FIG. 1, the target 10 is tracked by a target tracker 12 which moves the field projector 14 so that its boresight is directed towards the target. The field projector 14 projects an information field 16 centred on the boresight and which illuminates the projectile 18 so that an aft-looking information field receiver (not shown) in the projectile can determine its position relative to the centre of the field.

Examples of typical information field guidance systems are described in our U.K. Published Patent Applications Nos. 2133652 and 2158316.

In the arrangement shown, the projectile calculates its X and Y coordinates relative to the centre of the field and is controlled to fly along the boresight of the field projector. However, as mentioned in the introduction, the boresight, although directed to the nominal target position as determined by the target tracker, may not actually intercept the target, so the projectile may not hit the target.

Figure 2:
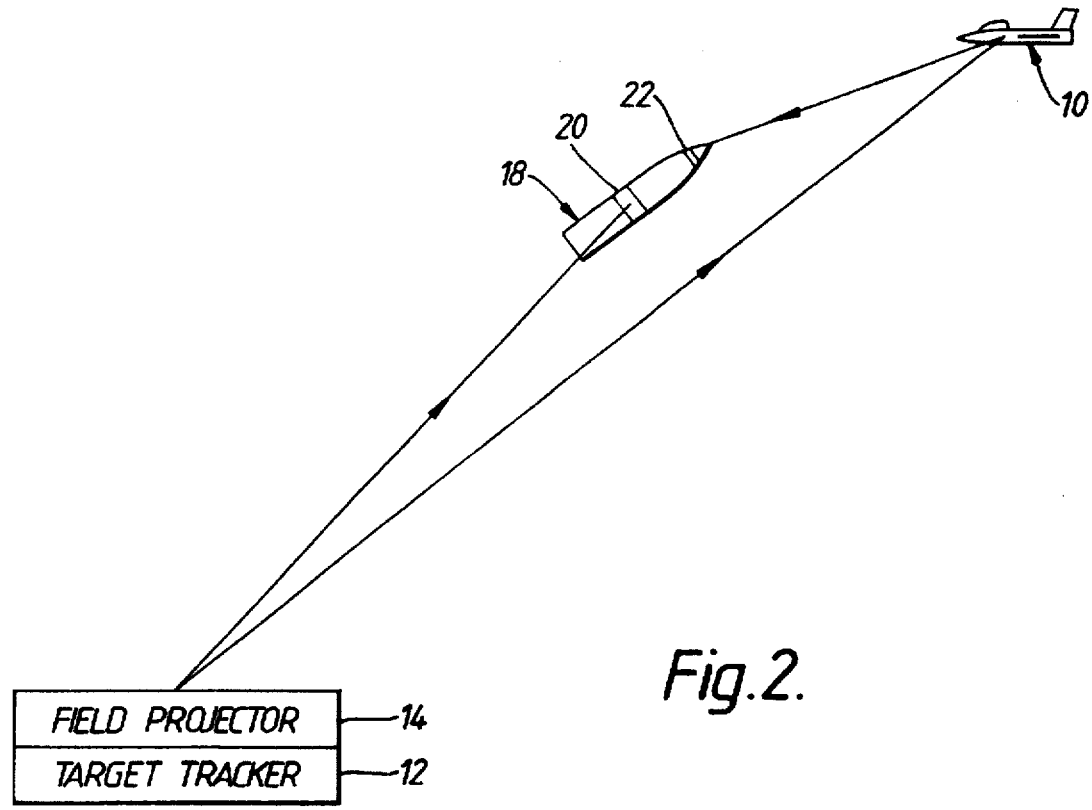
FIG. 2 illustrates the principles of operation of a projectile guidance system in accordance with the invention.
Figure 3:
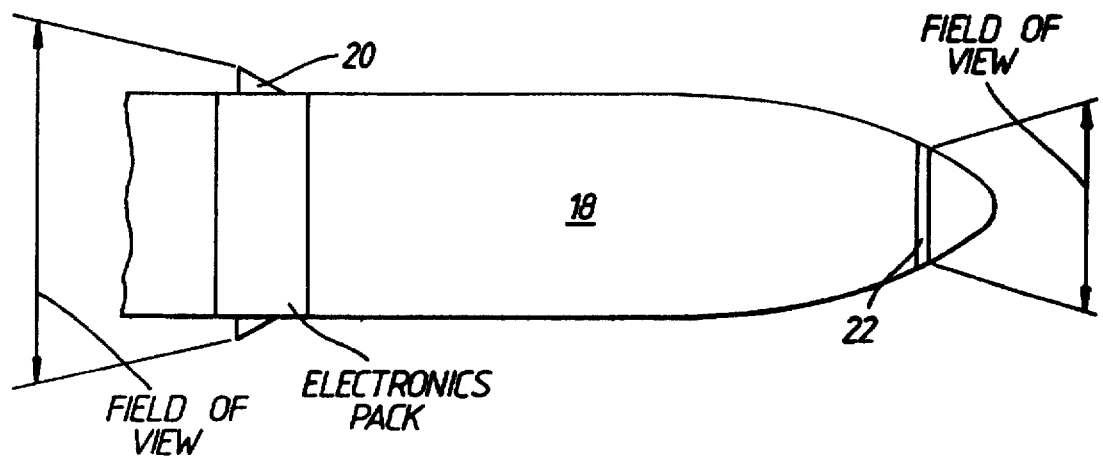
FIG. 3 illustrates the forebody of a projectile for use in the system of FIG. 2.

The system illustrated in FIG. 2 has the same basic components as FIG. 1 but the missile senses both the information field as received directly from the field projector 14 and as reflected by the target via respective aft- and forward looking information field receivers 20,22 respectively. The forebody of the projectile is shown in FIG. 3. The aft-looking receiver 20 has a somewhat wider field of view than the forward looking receiver 22 because the latter is used only during the terminal phase of flight of the projectile.

The signal incident on the aft-looking receiver 20 is processed in the conventional way to determine projectile to boresight position. The forward looking receiver 22 will detect that part of the information field reflected by the target and this part will contain information representing the position of the target relative to the boresight. The signal incident on the forward looking receiver 22 is processed during the terminal phase of flight to determine the target to boresight position. The projectile to boresight position data is combined during the terminal phase with the target to boresight position data to give the projectile to target position. Thus the projectile may be guided to intercept the target and not merely to the centre of the field.

The signals on the receivers 20 and 22 are also monitored to determine the time difference between the arrival of the direct information field signal received by the aft-looking detector 20 and the arrival of the reflected information field signal received by the forward-looking detector 22. This time difference may be processed to determine the range to go and its derivative,closing velocity, for the projectile and target.

Figure 4:
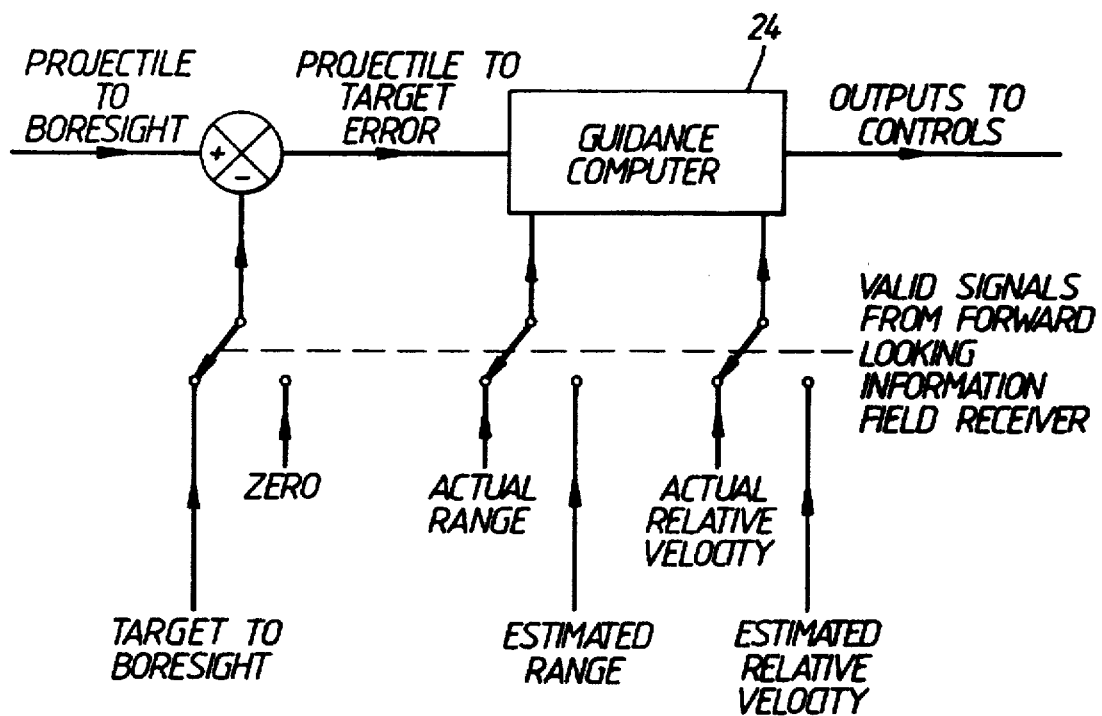
FIG. 4 illustrates a schematic diagram of the guidance control loop for the projectile of FIG. 3.

The guidance control loop of the projectile is shown in FIG. 4. The projectile to boresight position or error is compensated by the target to boresight position and the resultant signal passed to a guidance computer 24 which receives "range" signal and relative velocity signals and provides signals to the projectile controls. During the initial phase of the projectile flight, the target to boresight error is set to zero and estimates are obtained for the range and relative velocity. For the final interception phase of the projectile, values for the target to boresight position, the actual range and the relative velocity are derived from the processed outputs of the information field receivers.

Direct measurement of range and relative velocity allows a significant improvement in guidance accuracy compared with obtaining the information by indirect means and, in combination with the improvement due to referencing the projectile to the target, gives the opportunity to achieve so called "hittile" performance whereby the projectile impacts the target directly.

The hardware design for the disclosed system is relatively straightforfward as, in general, it will only require another information field receiver/decoder and minor software changes. Their technique is also of great benefit as it may allow radar information field guidance to be sufficiently accurate to replace a laser information field guidance system with a consequent saving in cost and mass.

We claim:

1. A navigational system for determining a relative position of two objects, which comprises:

projector means for projecting an information field to be at least partially incident on both said objects, said information field having a reference and being defined by a radiation beam scanned over a field of view, whereby the position relative to said reference of an object in said field can be determined by monitoring that part of the field incident on said object, one of said objects including first receiver means for detecting a first part of the scanned information field incident on said one object and further including second receiver means for detecting a second part of the scanned information field reflected by an other object, and processor means, associated with said one object, responsive to said first and second receiver means to determine positions of said two objects relative to said reference, said processing means receiving the scanned information field reflected by said one object and by said other object for processing said information relative to said reference in said scanned field-of-view to determine positions of both said one object, and said other object, relating to said missile in said scanned field-of-view.

2. A navigational system according to claim 1, wherein said objects are spaced longitudinally with respect to said projector means, and said first and second receiver means are associated with an object nearer the projector means, and said first receiver means comprises aft-looking information receiver means for detecting the information field incident thereon and said second receiver means comprises forward-looking information receiver means for detecting the information field reflected by the other object.

3. A navigational system according to claim 1, which includes range determining means responsive to the relative times of arrival of said information field at said objects, thereby to determine their ranges relative to the projector means.

4. A projectile guidance system for determining angular positions of a projectile and a target relative to a reference, which comprises:

projector means for projecting an information field towards a nominal target position, said information field having a reference and being defined by a radiation beam which is scanned over a field of view, whereby the position relative to said reference of an object in said field can be determined by monitoring that part of the field incident on said object, and a projectile having aft-looking information field receiver means for receiving said scanned information field from said projector means, forward-looking information field receiver means for receiving the scanned information field reflected by said target, and processor means, receiving information from said aft-looking information field receiver means, and receiving information from said forward-looking field receiver means for processing said information relative to said reference in said scanned field-of-view to determine positions of both said missile, and said target, relative to said missile in said scanned field-of-view.

5. A projectile guidance system guidance according to claim 4, which includes range determining means responsive to the times of arrival of the information field at said aft-looking and forward-looking information field receiver means to determine the range to go between the projectile and the target and/or the closing velocity.

6. A projectile guidance system according to claim 5, which includes course-correction processing means for processing the outputs from said aft-looking and forward-looking projector means and said range determining means to obtain course-correction signals for guiding the projectile to intercept said target.

7. A projectile guidance system according to claim 6, wherein, during an initial part of the projectile trajectory, course-correction commands are calculated on the basis of the error between the projectile and a datum axis, and for the final part of the trajectory, course correction commands are calculated on the basis of projectile to target error.

8. A projectile for use in a projectile guidance system in which the projectile and the target are illuminated by an information field, said information field having a reference and being defined by a radiation beam scanned over a field of view, whereby the position relative to said reference of an object in said field of view can be determined by monitoring that part of the scanned field incident on said object, said projectile including first means for receiving a portion of said scanned information field from which the position of the projectile relative to said reference may be calculated and second means for receiving a portion of said information field reflected from said target from which the position of a target relative to said reference may be calculated, and processor means, receiving information from said first means, and receiving information from said second means for processing said information relative to said reference in said scanned field-of-view to determine positions of both said missile, and said target, relating to said missile in said scanned field-of-view.

9. A projectile according to claim 8 further includes course-correction processing means for deriving course-correction signals from the output from said means for receiving.

10. A projectile according to claim 9, wherein said processing means is provided on board said projectile.

11. A method for determining the relative position of two objects, which comprises:

projecting an information field to be at least partially incident on both said objects, said information field having a reference and being defined by a radiation beam scanned over a field of view, whereby the position relative to said reference of an object in said field can be determined by monitoring that part of the scanned field incident on said object, receiving a first scanned information field from an aft direction and receiving a second scanned information field from a forward direction;

processing said information relative to said reference in said scanned field-of-view to determine positions of both said missile, and said target, relating to said missile in said scanned field-of-view; and using the determined positions obtained from the information field incident on said one object and the information field reflected by said other object to determine their relative positions.

12. A method according to claim 10 or 11, wherein said step of determining is carried out on board one of the objects.

13. A method for determining the range-to-go and/or the closing velocity between two objects which comprises illuminating said objects with a beam of radiation from a source generally in line with said objects monitoring the times of arrival at the object closer to the source of radiation direct from said source and radiation reflected from the other object thereby to determine the range-to-go or the closing velocity.

* * * * *